Figure 1:
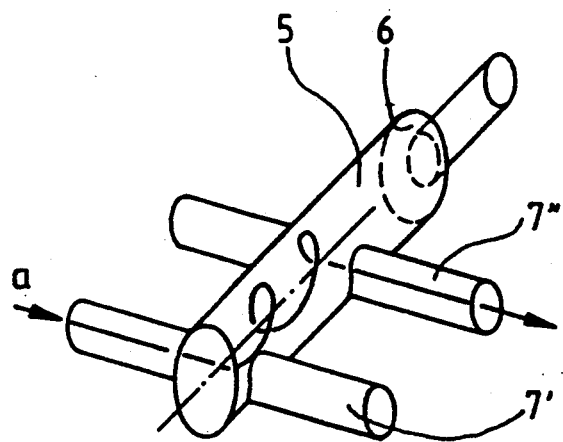

United States Patent

Marin et al.

[11] Patent Number: 5,113,909
[45] Date of Patent: May 19, 1992

[54] CLOSING MEMBER FOR A VALVE

[75] Inventors: Seppo Marin; Jouni Pyötsiä, both of Helsinki, Finland

[73] Assignee: Neles Oy, Helsinki, Finland

[21] Appl. No.: 412,593

[22] Filed: Sep. 26, 1989

Related U.S. Application Data

[63] Continuation-in-part of Ser. No. 282,058, Dec. 9, 1988, abandoned.

[30] Foreign Application Priority Data

Jan. 4, 1988 [FI] Finland .................................. 880008

[51] Int. Cl.⁵ .................... F16K 47/02; F16K 47/04; F16K 5/10
[52] U.S. Cl. .............................. 137/625.32; 251/209; 137/625.3
[58] Field of Search .................. 137/625.32, 625.3; 251/209

[56] References Cited

U.S. PATENT DOCUMENTS

| | | | |
|---|---|---|---|
| 1,913,149 | 6/1933 | Atwater | 251/209 X |
| 4,156,438 | 5/1979 | Kiesow | 251/209 X |
| 4,212,321 | 7/1980 | Hulsey | 251/209 X |
| 4,774,984 | 10/1988 | Peters | 137/625.32 |
| 4,889,163 | 12/1989 | Engelbertsson | 251/127 X |

FOREIGN PATENT DOCUMENTS

| | | | |
|---|---|---|---|
| 2352370 | 4/1975 | Fed. Rep. of Germany | 137/625.32 |
| 2506420 | 11/1982 | France | |
| 880580 | 8/1988 | PCT Int'l Appl. | |
| 449031 | 3/1987 | Sweden | |

OTHER PUBLICATIONS

Advances in Instrumentation, "Multiple Stage Pressure Letdown Valves", Oct. 1983, by Ervin A. Skovgaard.

Primary Examiner—Arnold Rosenthal
Attorney, Agent, or Firm—Cushman, Darby & Cushman

[57] ABSTRACT

Closing member (1) for a valve, which said closing member can be fitted turnably into a valve housing provided with a through flow duct (3,4). Several main ducts (5) placed side by side pass through the closing member, said main ducts jointly forming the flow opening in the closing member. At least some of the main ducts (5") in the closing member (1) are connected to one or several of the main ducts (5',5''') placed side by side by means of the side ducts (7) eccentric relative the main duct so that the central axes of the main and side ducts are in different planes placed at a distance from each other.

17 Claims, 5 Drawing Sheets

A-A

CLOSING MEMBER FOR A VALVE

This is a continuation-in-part of application No. 07/282,058, filed Dec. 9, 1988, which was abandoned upon the filing hereof.

The present invention concerns a closing member for a valve, which said closing member can be fitted turnably into a valve housing provided with a through flow duct, whereat several main ducts placed side by side pass through the closing member, said main ducts jointly forming the flow opening in the closing member.

From the German Pat. No. 2,359,717 a valve is known in whose closing member the flow opening consists of a number of ducts placed side by side.

In the European Pat. No. 13,601 a valve is described in which one or several perforated attenuation plates are fitted in the opening of the closing member, which is shaped as a body of revolution, e.g. a ball or a cylinder. The plates are fitted so that, in the opened position of the closing member, they are parallel to the direction of flow. When the valve is in partly open position, i.e. in a regulating position, part of the flow passes through the holes in the attenuation plates. The function of the attenuation plates is to reduce cavitation and the noise and wear resulting from cavitation when the valve is in a regulating position.

In the published German Pat. application No. 2,352,370 a valve is described wherein the closing member consists of a hollow cylinder. The flow openings consist, e.g., of a number of bores placed side by side in the opposite walls of the cylinder. In the cylinder, a perforated attenuation plate is fitted, which is placed as transverse to the direction of flow in the opened position of the closing member.

The closing member in accordance with the present invention is characterized in that at least some of the main ducts in the closing member are connected to one or several of the main ducts placed side by side by means of side ducts eccentric relative the main duct so that the central axes of the main and side ducts are in different planes placed at a distance from each other.

When the ducts are connected to each other eccentrically so that their central axes are in different planes, in a choking position of the valve, i.e. in a partly opened position, the flow has to change its direction in different planes, whereby a turbulence flow is produced in some of the ducts around the longitudinal axis.

More specifically, the present invention concerns a closing member, such as a ball, ball sector, plug or part of a plug, to be fitted into a quarter-turn valve or equivalent and a set of flow ducts passing through said closing member, the inlet opening and the flow-through of said set of flow ducts depending on the position of the closing member relative the opening at the inlet side of the valve, i.e. on the degree of opening.

The primary object of the invention is to produce a change in the energy state of the flowing medium (dissipation) related to the flow choking process, so that the accurately designed three-dimensional form of the set of flow ducts attenuates the noise produced in the valve choking process and the erosion caused by the flow in the valve with maximum efficiency. The invention carries out this by means of turbulence flow in a minimum of space by distributing the occurrences in the dissipation process evenly in the internal set of flow ducts in the closing member.

A secondary object of the invention is to achieve maximum operating safety and optimal mechanical construction by means of a particular constructional solution, wherein the closing member with the flow ducts formed into same is made of one piece.

The set of turbulence-flow ducts formed inside the closing member consists of a number of main ducts, which are straight or provided with shoulders and which are interconnected by side ducts transverse to the main ducts placed side by side. In view of achieving the primary object of the invention, the set of ducts is manufactured so that, when the flow is choked, a turbulent flow or whirl is produced around the central axes of certain ducts. For example, all or some of the centre lines of the side ducts are placed sufficiently far apart, and in different planes, from the centre lines and from the planes of the centre lines of the connected main ducts, so that the quantity of movement of the flow taking place through a side duct produces a turbulent flow in the main duct concerned. In the choking process taking place in the valve, the potential energy bound in the pressure of the medium is thereby, by the effect of said turbulence, converted to heat efficiently, and the local flow speeds are minimized.

It is an advantage of the turbulent flow that the cavitation takes place in the middle of the whirl. This reduces the wear caused by cavitation and applied to the closing member. By means of the numbers and mutual proportions of the main and side ducts, it is possible to affect the characteristic curve of the valve regulating, whether said curve is so-called linear or equipercentual. The turbulence effect depends on the ratio of the quantity of movement of the flow in the side ducts to the quantity of movement of the flow in the main ducts, and, as a rule, this effect becomes lower when the closing member is being opened. The set of ducts with turbulent flow can be accomplished by means of a separate cartridge, which is fitted precisely in the closing member and into which the sets of ducts have been formed, the closing member being provided with an opening for said cartridge. Alternatively, the set of ducts with turbulent flow may be placed directly in a monobloc closing member. The turbulent effect in a side duct can also be accomplished in a significant way.

In a monobloc closing member, the flow ducts are formed, e.g., by drilling or casting into a piece of one part in the way described above, but also so that no turbulent effect is produced.

In a conventional globe valve, it is a problem that, when the valve is being opened, the seal remains unsupported at the opening of the closing member. In the solution in accordance with the present invention, the outer face of the closing member placed between the flow ducts can be shaped so that it acts as a support face for the seal in the choking position of the closing member, i.e. when the closing member moves, the seal is in a gliding contact with this face. This construction prevents any flow between the seal and the closing member, and it prevents formation of a high local surface pressure at the edge of the flow opening, which said pressure causes jamming of the seal and uneven, jerky regulating movement in the case of a conventional closing-member solution.

Figure 2:
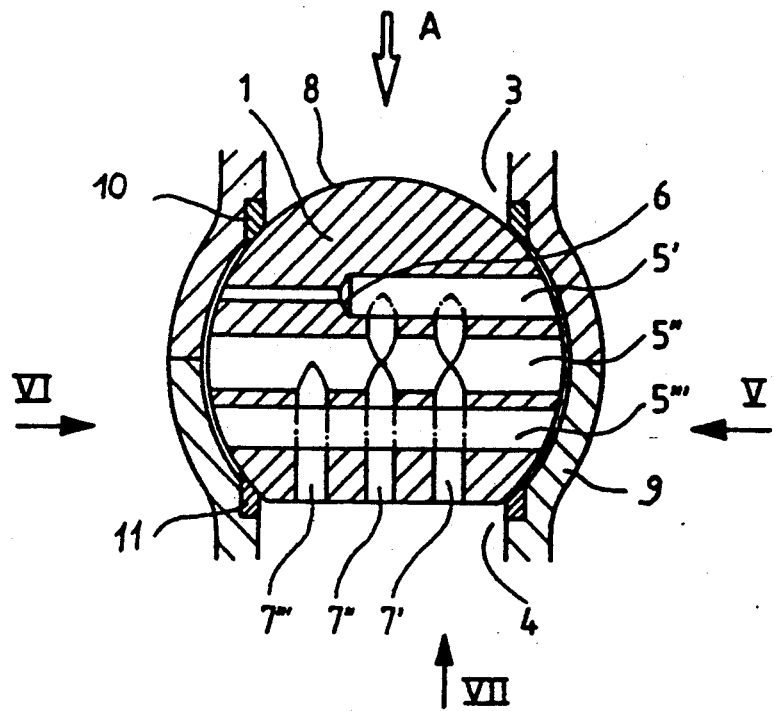
Figure 3:
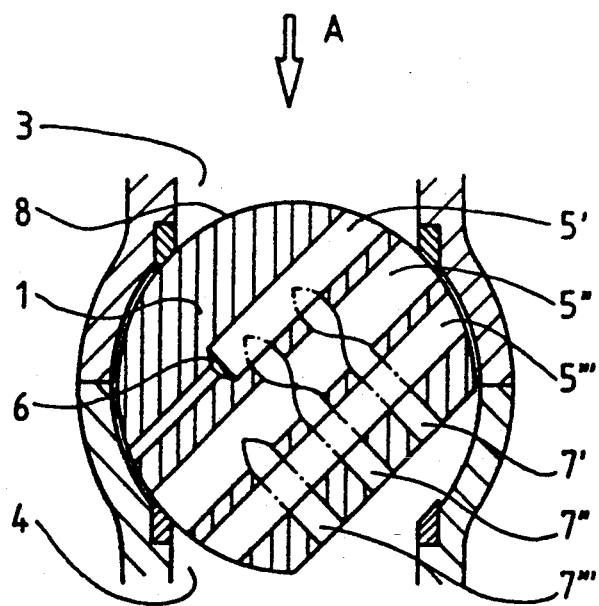
Figure 4:
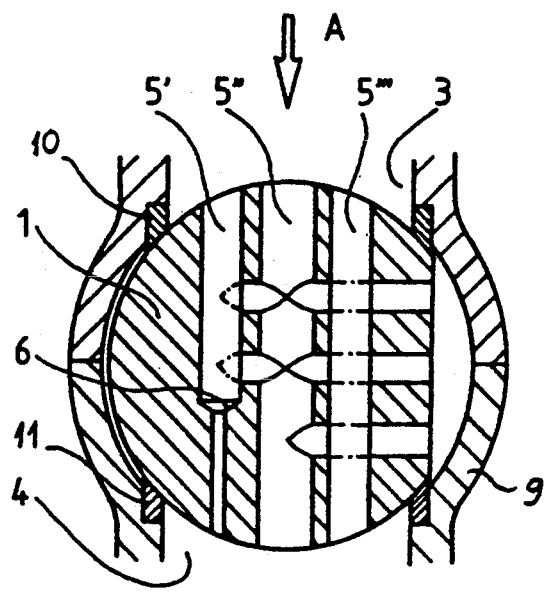
Figure 5:
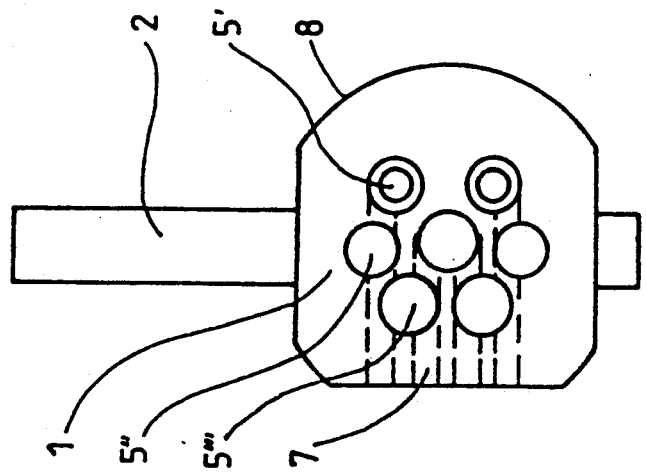
Figure 6:
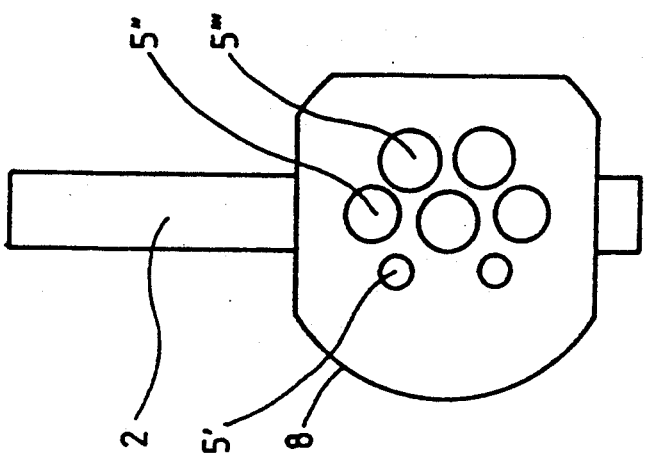
Figure 7:
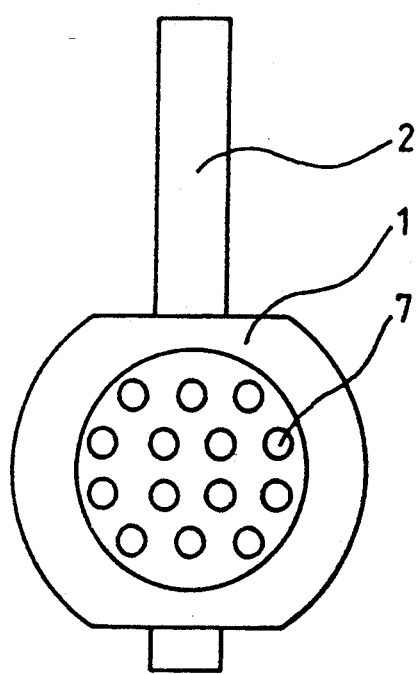

The invention and its details will be described in more detail in the following with reference to the accompanying drawings, wherein FIG. 1 is a perspective view of one flow duct in a closing member and of two side ducts passing across said flow duct, FIG. 2 is a sectional view of a closing member in accordance with one embodiment of the invention, seen from the top of the valve and in the closed position, FIG. 3 shows the same in a regulating position, FIG. 4 shows the same in the fully opened position, FIG. 5 shows the same closing member as viewed in the direction of the arrow V in FIG. 2, FIG. 6 shows the same as viewed in the direction of the arrow VI in FIG. 2, and FIG. 7 shows the same as viewed in the direction of the arrow VII in FIG. 2, FIG. 2-1

Figure 8:
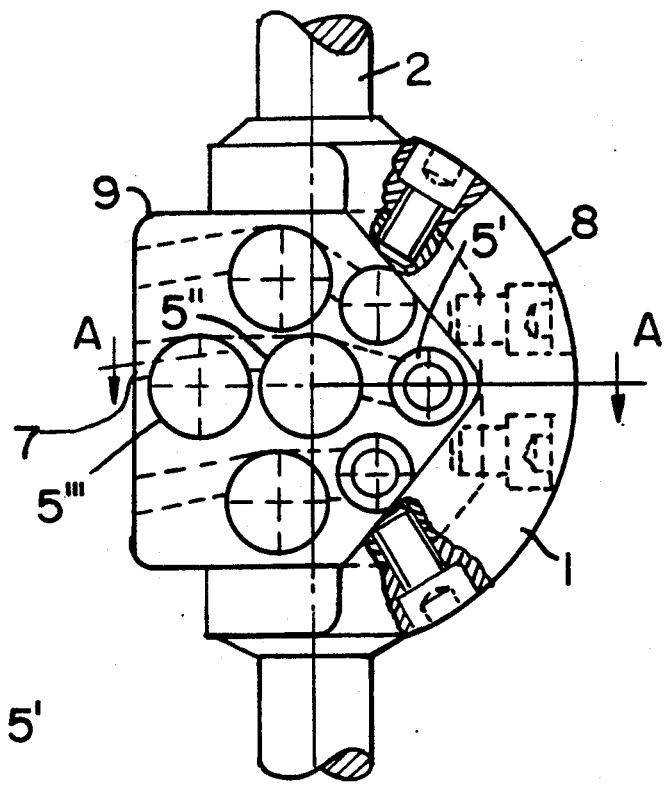
Figure 9:
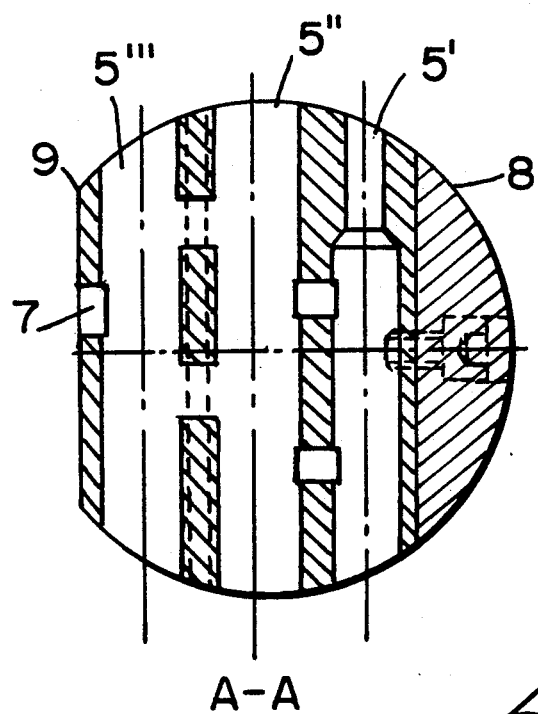

FIG. 8 shows a perspective view of main and side ducts, the side ducts having rectangular cross sections, FIG. 9 shows a similar view as FIG. 5 of a closing member in which the duct systems are made into a separate cartridge, (The closing member shown in the sectional views in FIGS. 2 to 4 is not an exact equivalent of the closing member shown in the side views in FIGS. 5 to 7 in respect of the locations of the ducts.)

In the drawings, a spherical closing member 1 of a globe valve is shown, which is provided with a turning spindle 2. The closing member is fitted turnably in the valve housing 9, which is connected with the wall parts of the through-flow duct, i.e. the inlet-side duct 3 and the outlet-side duct 4. (The flow direction in the FIGS. 2 to 4 is denoted with the arrow A.) Between the housing and the closing member, there are annular seals 10 and 11.

FIG. 1 shows a main duct 5 provided with a shoulder and two side ducts 7, 7" passing through said main duct. Turbulent flow is illustrated by means of the flow line a. The shoulder 6 causes a resistance to flow in the main duct and increases the flow in the side ducts.

In the closing member, the main ducts 5 separate from each other have been formed, e.g., by drilling or casting. When the valve is fully opened (FIG. 4), these main ducts 5 are parallel to the flow duct of the housing, and in the closed position (FIG. 2) they are transverse to the flow duct. In the open position, the ducts 5 cover the major part of the area of the flow duct in the housing.

Those ducts 5' that are placed closer to the inlet side in the closed position may be stepwise holes which have been made, e.g., by using several drills of different sizes so that, in the opened position, the duct portion placed at the inlet side has a larger diameter than the duct portion placed at the outlet side, a shoulder 6 being provided between the two diameters. The length of the part that has the largest diameter may be larger in the ducts 5" that are, in the closed position, placed closer to the outlet end 4, whereby, in the ducts 5'" placed closest to the outlet end, most appropriately a larger diameter is used over the entire length.

In addition to the main ducts 5, the closing member is provided with side ducts 7, which pass transversely to the main ducts and interconnect main ducts placed side by side. The cross-sectional area of each side duct 7 is smaller than the cross-sectional area corresponding to the largest diameter of a main duct, and all or some of the centre lines of the side ducts are placed in a different plane sufficiently far away from the centre lines of the main ducts 5 connected with them.

FIG. 8 illustrates the manner in which the side ducts 7 are place with respect to the main ducts 5, with the plane containing the center lines of the side ducts being visibly spaced apart from but still parallel to the plane containing the center lines of the main ducts. The side ducts 7, however, are placed such that at least some of the side ducts are tangentially coplanar with at least some of the main ducts 5. The mantle faces of the side ducts may contact the mantle faces of the connected main ducts tangentially. The side ducts may be manufactured, e.g., by casting or by drilling them from the direction of the outlet face of the closed position towards the main ducts. The projection of a side duct may be at such an angle relative the main duct, in a plane that passes through the central axis of the main duct and is parallel to the axis of the side duct, that, when arriving in the main duct out of the side duct, the projection of the flow in said plane changes its direction by 150° or less. The side ducts do not extend from the outlet side to the inlet side in the closed position of the closing member, whereby the closing member closes the flow in the pipe system.

In this way, the main ducts 5 and the side ducts 7 form several grill-like three-dimensional networks placed one above the other inside the closing member. The networks placed one above the other may be completely separate from each other, or they may communicate with each other through ducts that are placed partly overlapping each other. In any case, there are several main ducts both side by side and one above the other, and so also side ducts.

The invention is not confined to the embodiment described above alone, but it may show variation in different ways within the scope of the patent claims.

Figure 10:
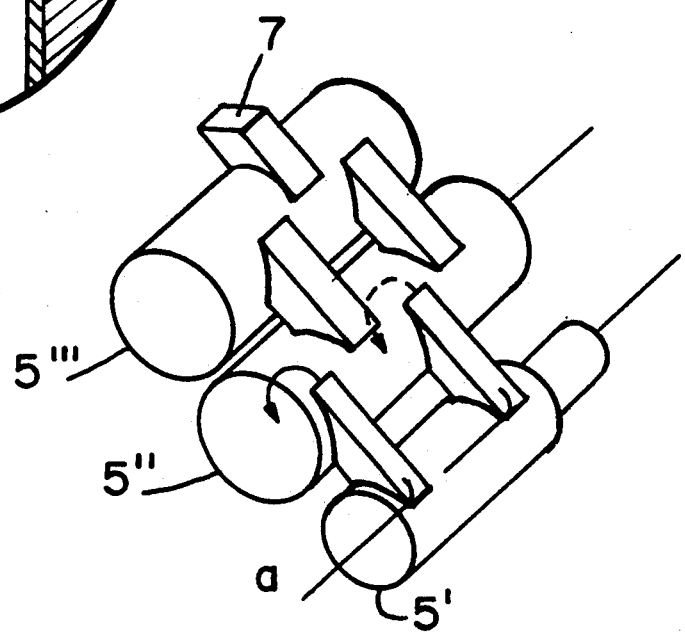

The ends of side ducts 7 that are placed at the outlet side in the closed position may also be closed. This can be accomplished, e.g., by using a separate cartridge to be fitted into the closing member and provided with bores, or by closing the ends of the ducts in some other way. FIGS. 9 and 10 show an embodiment where the main and side ducts 5 and 7 have been made into a separate cartridge 14 fitted into the closing member 1. The cartridge 14 acts as a male member and fits into a similarly formed female opening in the closing member 1. The cartridge 14 is held in place by a securing means. In a preferred embodiment, the securing means comprises a series of socket head screws 16 which pass through counterbored holes in the closing member 1 to threadably engage cartridge 14.

A closed closing face 8 may also be placed at the outlet side only, so that the side ducts 7 are opened in the closing position towards the inlet side 3.

The shoulders 6 in the main ducts are not indispensable.

The main and side ducts may be placed in planes that are perpendicular to the turning axis of the closing member, or they may be placed diagonally to said plane.

Instead of a spherical closing member, some other body of revolution, such as a cylinder, cone, or a part of same, may also be used.

The principle of the invention can also be applied to a butterfly valve so that the side face of the disc is provided with a corresponding grill-like set of ducts consisting of crosswise bores.

Facing one diameter of the main duct, it is also possible to fit two or more side ducts one above the other.

Instead of circular cross sections of the ducts, it is also possible to use sections of other form, e.g. elliptic sections, or the side ducts may also be rectangular. However, with circular section, the attenuation by means of turbulence takes place most efficiently. Some of the ducts may be free from turbulence, in which case their section may be chosen arbitrarily, e.g., to intensify the mechanism of formation of turbulence in some other, connected duct.

FIG. 8 shows three main ducts 5', 5", 5''' which are connected with side ducts 7 having rectangular cross sections. (The view is similar to FIG. 1 which means that only the mantle surfaces of the ducts are shown, not the closing member itself.)

A monobloc closing member may have main ducts between which the outer face is in a gliding contact with the seal when the closing member moves.

What is claimed is:

1. Closing member for a valve, where said closing member can be fitted turnably into a valve housing provided with a through flow duct, the closing member containing a plurality of main ducts and side ducts, each said duct having a center line, wherein said main ducts placed side by side pass through the closing member, said main ducts forming the flow opening in the closing member, wherein at least some of said main ducts in the closing member are in flow communication with each other by means of said side ducts with at least some of said side ducts being disposed eccentrically relative to said main ducts so that the center line of each such side duct is spaced from the center line of an associated main duct with which the said side duct is in communication, wherein each said side duct is in flow communication with at most a portion of the total number of said main ducts, the cross section of each said main duct is concavely curved, said closing member including a mantle surface surrounding said main and said side ducts.

2. Closing member as claimed in claim 1, characterized in that the cross sections of said main ducts and of said side ducts are symmetric relative the center lines of the ducts.

3. Closing member as claimed in claim 2, characterized in that at least some of said side ducts have circular cross sections.

4. Closing member as claimed in claim 2, characterized in that at least some of said side ducts have rectangular cross sections.

5. Closing member as claimed in claim 2, characterized in that at least some of said main ducts have circular cross sections.

6. Closing member as claimed in claim 1, characterized in that at least in some of the main ducts the cross section of the main ducts becoming smaller in the direction of flow.

7. Closing member as claimed in claim 1, characterized in that the side ducts pass through all the main ducts.

8. Closing member as claimed in claim 1, characterized in that one of the ends of the side ducts communicates with one end of the through flow duct of the housing in the closed position of the closing member.

9. Closing member as claimed in claim 8, characterized in that one of the ends of the side ducts (7) communicates with the outlet end (4) of the through flow duct of the housing in the closed position of the closing member.

10. Closing member as claimed in claim 1 characterized in that at least some of the side ducts intersect with the main ducts so that at least one plane is tangent to both a surface of the side duct and a surface of the main duct.

11. Closing member as claimed in claim 1, characterized in that the closing member with the main and side flow ducts formed is made of one piece.

12. Closing member as claimed in claim 1, characterized in that the main and side ducts are formed in a separate cartridge fitted to the closing member.

13. Closing member as claimed in claim 1, characterized in that an outer face of the closing member forms a continuous support face for a closing seal, the support face interrupted only by the main ducts.

14. The invention as claimed in claim 1 wherein said valve closing member has a wall defining a cartridge receiving recess and said main and side ducts are formed in a cartridge insertable into said recess.

15. The invention as claimed in claim 14 wherein the cartridge is fastened to the closing member by securing means.

16. The invention as claimed in claim 15 wherein the securing means comprises:
   a series of counterbored holes in the closing member;
   a like series of screws, such that the screws pass through the counterbored holes to threadably engage the cartridge.

17. Closing member as claimed in claim 1 wherein the change of flow direction, to a main duct from a side duct, is no more than 150° as measured by the angle formed by the projection of flow in said side duct onto a plane which intersects the central axis of said main duct and which is additionally parallel to the central axis of said side duct.

* * * * *